United States Patent
Manos, Jr. et al.

(10) Patent No.: US 7,032,266 B1
(45) Date of Patent: Apr. 25, 2006

(54) PLIER-LIKE IMPLEMENT

(76) Inventors: James Thomas Manos, Jr., 2711 Race Ave., Pittsburgh, PA (US) 15235; Joseph A. Curcio, 4769 Allegheny River Blvd., Verona, PA (US) 19605

( * ) Notice: Subject to any disclaimer, the term of this patent is extended or adjusted under 35 U.S.C. 154(b) by 0 days.

(21) Appl. No.: 11/174,148

(22) Filed: Jul. 1, 2005

(51) Int. Cl.
  *B25B 7/22* (2006.01)

(52) U.S. Cl. .................................... 7/129; 7/130; 7/131

(58) Field of Classification Search .............. 7/129, 7/130, 131, 132, 418, 424.5, 426

See application file for complete search history.

(56) References Cited

U.S. PATENT DOCUMENTS

| | | | | |
|---|---|---|---|---|
| 653,920 A | * | 7/1900 | Parks | 81/15.7 |
| 913,225 A | * | 2/1909 | Moline | 7/132 |
| 1,304,720 A | * | 5/1919 | Young | 433/4 |
| 3,276,300 A | * | 10/1966 | Sussman | 81/417 |
| 3,710,657 A | * | 1/1973 | Cusato | 81/352 |
| 4,035,917 A | * | 7/1977 | Roberts | 433/145 |
| D281,195 S | * | 10/1985 | Kurz | D24/153 |
| 5,572,914 A | * | 11/1996 | Coleman | 81/424.5 |
| D406,031 S | * | 2/1999 | Toshima | D8/52 |
| 6,098,508 A | * | 8/2000 | Battistone | 81/416 |

* cited by examiner

*Primary Examiner*—Lee D. Wilson
*Assistant Examiner*—Alvin J. Grant

(57) ABSTRACT

A plier-like tool of appropriate design allows expeditious manipulation of articles in confined areas. For example, the tool is particularly useful in removing fish hooks; the hook is cut and grasped for removal in such limited spatial environment. The tool includes a non-planar arcuate cutter as well as a grasping region.

5 Claims, 2 Drawing Sheets

PLIER-LIKE IMPLEMENT

TECHNICAL FIELD

This invention relates to hand tools and in particular hand tools involving a plier-like configuration.

BACKGROUND OF THE INVENTION

Despite the ubiquitous use of power tools, there is still a substantial interest in implements designed for hand manipulation. One particularly common group of hand tools involves a plier-like configuration. In particular two opposing members are employed. Each member has a handle end and an application end. A pivot linking the two plier members is employed in a configuration such that the movement of the two handle ends away from each other produces a corresponding movement of the two application ends similarly away from each other. Thus as shown in the plan view of FIG. 1, the movement of handles 1 and 2 in directions 3 and 4 respectively induces the corresponding application ends 5 and 6 to similarly move in directions 7 and 8 due to a pivoting of the members around pivot 9. This movement is generally induced by using one member including handle 1 and application end 5 while the other member includes handle 2 and application end 6. The x-like configuration of the two members together allows a movement around pivot 9 to produce the desired motion. Generally the configuration of each application end is shaped for a particular intended use. For example, the configuration of FIG. 1 at application ends 5 and 6 is useful for bending wires or picking up small objects.

Frequently, the application ends have a planar structure, i.e., they do not extend more than 3 mm beyond either of two planes tangent to pivot 9 at either of its extremes and perpendicular to the axis of the pivot. Thus as shown in FIG. 2 in a cross-sectional view of the tool shown in FIG. 1, the imaginary planes are those shown by dotted lines 21 and 22 perpendicular and tangent to pivot 9 and perpendicular to the axis 23 of pivot 9. Although many plier-like tools are planar, the variety of contemplated uses for such tools has engendered non-planar configurations. For example, some needlenose pliers have application ends that are bent at an abrupt 90 degree angle. This configuration is shown in the cross-sectional view of FIG. 3 for uses such as automotive repair where a handle 3, pivot 9, and application end 6 are shown. Thus in the view of FIG. 4 corresponding to the section shown in FIG. 2, a non-planar configuration results from the extension of member 6 beyond plane 21 a distance, 43, greater than 3 mm.

Other plier-like hand tools include what is generally denominated wire cutters. Such implements rather than having a grasping application end have two opposing wedge shaped regions of the application ends that, in a particular use of the tool, are sufficiently sharp to allow the severing of the material to be cut. Such tools are widely used in the electrical and mechanical trades. Although centuries of designs have led to a variety of configurations for plier-like tools, new applications or unresolved problems in old applications continue to spur the design process.

SUMMARY OF THE INVENTION

It has been found that in some applications both a combination of grasping and cutting actions is required. Further, in such multiple use situations the typical configuration for grasping plier-like implements or wire cutter plier-like implements are insufficient. This realization is especially true when the object to be manipulated must remain distant from the closest approach of the user's hands. For example, it is often desired to remove a hook from a fish by snipping the shank of the hook as it is embedded in the fish. Clearly the user's hands must be remote from the region to be severed. Additionally, the attitude of the hook relative to the mouth opening often presents an angle of approach for the tool which makes the cutting action ineffective. Similarly in other applications such as in craft work, e.g. artificial or natural flower arranging again the approach of the user's hand to the object being manipulated is relatively large and the spatial region through which it is possible to reach such object is often limited.

For such applications it is particularly convenient to employ a plier-like structure such as shown in FIG. 5 in a plan view and FIG. 6 in a cross-sectional view. Both a cutting region 55 and a grasping region 64 are present. Not only is the application end 61 not planar, but it is configured to have a substantially arcuate shape as shown at 63. (The term arcuate shape in the context of this invention means a shape that is not linear for more than a distance of 1.5 mm over the distance from point 66 to point 67. Point 66 is where the shape begins to deviate from imaginary plane 22 as indicated in FIG. 2 and in FIG. 6. Point 67 is where the grasping portion of the application end begins.) Additionally the distance between point 52 and the axis of pivot 9, the separation distance, should be in the range of about 20 mm to 120 mm. (Point 52 begins at a point where member 4 and member 3 diverge by a distance of at least 6 mm more than their separation at pivot 9.) By employing a suitable separation distance and an arcuate application end it is possible to cut and/or grasp materials where the attitude between the tool and the material is limited and the distance between the user and the application end is relatively long.

Thus in one embodiment the inventive tool allows expeditious severing and/or removal of fishhooks as well as advantageous use in craft situations such as flower arranging.

DETAILED DESCRIPTION

Figure 7:
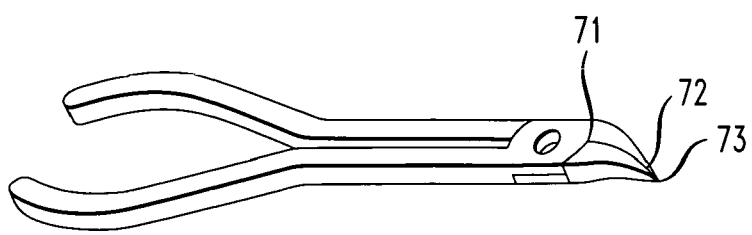

As discussed the inventive tool involves the use of an application end including both a grasping region and an arcuate cutting region. Additionally, the tool employs a relatively long separation region. An arcuate cutting region is one having no linear portion longer than 1.5 mm along the cutting edge. A linear portion is one that has an average deviation of less than 0.25 mm from the least square straight line fit to the cutting edge shape over the 1.5 mm distance. (An average deviation of this cutting edge from the least-square-fit line is the average distance from the line to the cutting edge measured at a normal to the line.) Thus the shape considered for determination of arcuate shape is that running along the cutting edge of the application end. As shown in FIG. 7, this cutting edge begins at 71 and ends at 72.

Generally, the length measured along the cutting edge should be in the range 8 mm to 24 mm. Lengths shorter than 8 mm typically do not allow cutting of nominal sized objects while cutting lengths longer than 24 mm although not precluded are generally inconvenient. In one embodiment the arcuate region has a circular shape with a radius typically in the range of 8 mm to 24 mm. Radii less than 8 mm generally do not provide the ability to work in limited spatial configurations while radii greater than 24 mm, although not precluded tend to be awkward in use. The grasping region need not be arcuate but in one embodiment continues the shape of the cutting edge. Typically, the grasping region should have a length as measured linearly from the tip 73 of the tool to the end 72 of the cutting edge in the range 3 mm to 15 mm. Lengths less than 3 mm typically make grasping of nominally dimensioned object difficult, while lengths longer than 15 mm, although not precluded, tend to be inconvenient. The cutting edge generally has a wedge-shaped cross section that is conducive to the severing of materials such as metallic wire, polymeric chord, and plant tissue. The grasping end, in contrast, to avoid severing of the material to be grasped should be shaped accordingly.

The separation distance should typically be at least 20 mm. Although substantial separation distances are not precluded, typically distances are limited to less than 120 mm for convenience. The separation distance is measured along the tool member from the axis of pivot 9 to the point 52—the first point where the two members in the closed position of the tool are separated by a distance of at least 6 mm more than the separation between the members at the pivot point. (This separation distance is measured by the shortest distance from a point along the inner edge of member 3 to the closest point of member 4.)

Figure 1:
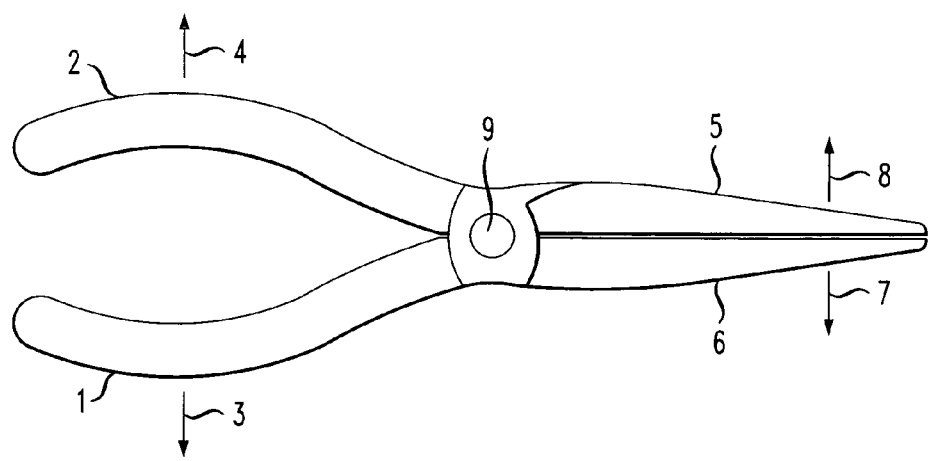
FIGS. 1, 2, 3, and 4 are illustrative of generic plier configurations.
Figure 2:
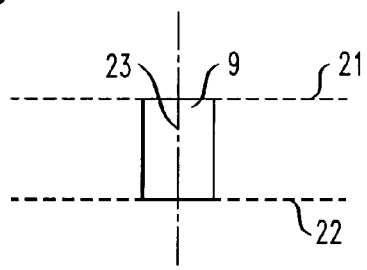
Figure 3:
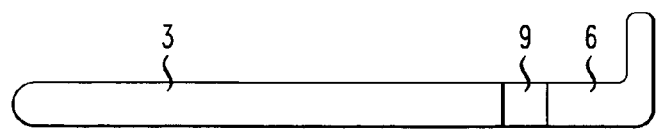
Figure 4:
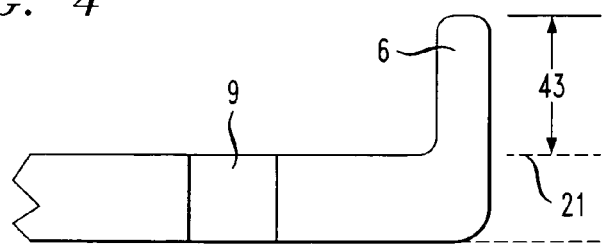
Figure 5:
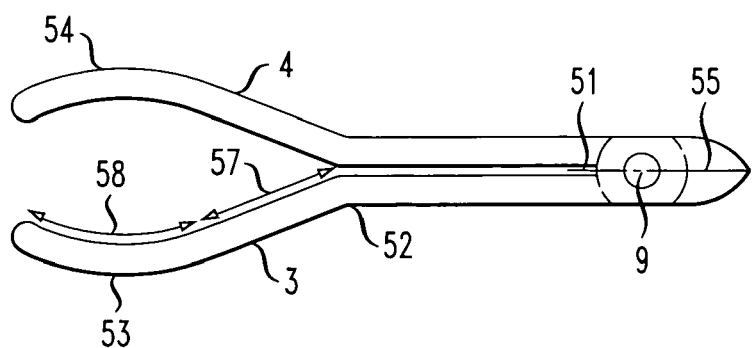
FIGS. 5, 6 and 7 are exemplary of configurations having an arcuate application end.
Figure 6:
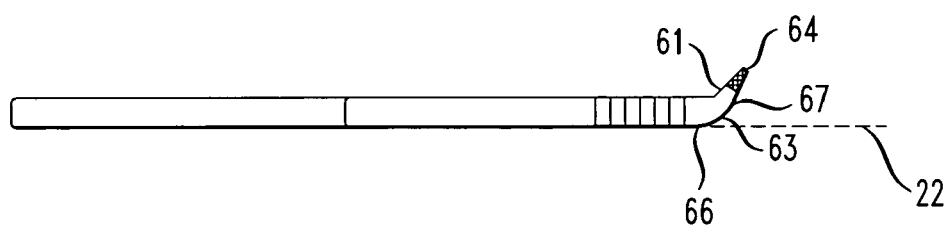

The configuration of the handle section of the tool, 54 and 53, is not critical but typically should be ergonomically adequate. Generally a combination of linear and circular shapes provide such comfort. Thus for example in FIG. 5 region 57 is linear and has a length in the range 0 to 60 mm, while region 58 has an inner radius in the range 20 mm to 60 mm and an outer radius in the range 30 mm to 70 mm. It is possible to provide a spring for example at point 51 to maintain the tool in an open position in the absence of application of force. Similarly if a spring is employed it is possible also to employ a latch to maintain the tool in a closed position during storage.

It is generally desirable to have the tip direction relative to the axis of the pivot in a specific angular range. In this context the axis of the pivot is an imaginary line through the center of the pivot and perpendicular to the plane defining the direction of movement of the two tool members. The tip direction is defined as the direction of a line tangent to the tool at the intersection between cutting and grasping region. To obtain, in general, the force necessary to sever typical materials, a lesser included angle between the axis and tip direction that is 15 degrees to 50 degrees is used. An angle less than 15 degrees is undesirable because of limited mechanical advantage while an angle greater than 50 degrees is disadvantageous because it limits operation in restricted spatial regions. The cross sectional shape of the separation region and the handle is not critical. Typically such shapes include rectilinear or circular forms. As discussed, the grasping region should not sever the material being manipulated. However, the surface configuration of such region is advantageously configured to hold the material being manipulated. Thus, the use of a region having knurling to enhance the gripping action is often desirable.

The composition of the material forming the tool is not critical. Typically materials such as cast stainless steel e.g. stainless 405, and high carbon forging steel are employed. The tool is formed from these materials by conventional techniques, such as a lost wax casting.

We claim:

1. A tool comprising two members, said members each having a handle end and an application end wherein said members are connected at a pivot in a configuration such that an increased separation of said handle ends causes an increased separation of said application ends characterized in that 1) said application ends are non-planar, 2) said application ends comprise a cutting region and a grasping region, wherein said cutting region is arcuate, and 3) said separation distance between a) said pivot and b) the point on said members where said members are separated at least 6 mm more than the separation of said members at said pivot, is at least 20 mm.

2. The tool of claim 1 wherein said separation distance is less than 120 mm.

3. The tool of claim 1 wherein the cutting edge of said application end has a length in the range 8 mm to 24 mm.

4. The tool of claim 1 wherein the lesser included angle between the tip direction and the axis of said pivot is in the range 15 to 50 degrees.

5. The tool of claim 1 wherein said two members comprise cast stainless steel.

* * * * *